(12) United States Patent
Baker et al.

(10) Patent No.: US 10,434,830 B2
(45) Date of Patent: Oct. 8, 2019

(54) SAFETY CHAIN ATTACHMENT

(71) Applicant: BARTLETT TRANSPORT IMPROVEMENTS PTY. LTD., Hallam, Victoria (AU)

(72) Inventors: Wayne Baker, Hallam (AU); Allan Bartlett, Hallam (AU)

(73) Assignee: BARTLETT TRANSPORT IMPROVEMENTS PTY. LTD., Hallam, Victoria (AU)

( * ) Notice: Subject to any disclaimer, the term of this patent is extended or adjusted under 35 U.S.C. 154(b) by 201 days.

(21) Appl. No.: 15/533,346

(22) PCT Filed: Oct. 10, 2014

(86) PCT No.: PCT/AU2014/050282
§ 371 (c)(1),
(2) Date: Jun. 5, 2017

(87) PCT Pub. No.: WO2016/054673
PCT Pub. Date: Apr. 14, 2016

(65) Prior Publication Data
US 2017/0341476 A1    Nov. 30, 2017

(51) Int. Cl.
*B60D 1/28* (2006.01)
*F16G 15/06* (2006.01)
(Continued)

(52) U.S. Cl.
CPC .............. *B60D 1/28* (2013.01); *B60D 1/18* (2013.01); *B60D 1/187* (2013.01); *F16G 13/12* (2013.01); *F16G 15/06* (2013.01)

(58) Field of Classification Search
CPC .. B60D 1/18; B60D 1/28; B60D 1/187; F16G 13/12; F16G 15/06
(Continued)

(56) References Cited

U.S. PATENT DOCUMENTS 1,836,169 A * 12/1931 Humphreys .............. E02F 3/60
                                                                    59/93
3,863,441 A *  2/1975 Kaufmann .............. F16G 17/00
                                                                    294/82.1
(Continued)

FOREIGN PATENT DOCUMENTS

DE    2 233 616 A1    3/1973
DE    24 33 345 A1    1/1976
(Continued)

*Primary Examiner* — Joseph M Rocca
*Assistant Examiner* — Felicia L. Brittman
(74) *Attorney, Agent, or Firm* — Seed IP Law Group LLP (57) ABSTRACT

An attachment for use with a safety chain which has a leading link and a following link, the attachment having a clevis with first and second lateral side sections and an opening between the side sections into which a leading end of the leading link is receivable; and a pin receivable by the first and second side sections so as to extend across the opening to couple the leading link to the clevis and a portion of the clevis defined between the first and second sections has a configuration complementary to a configuration of the leading end of the leading link; and/or portions of the first and second side sections have configurations complementary to configurations of portions of a leading end of the following link, such that there is a close fit between the clevis and chain when the leading link is coupled to the clevis by the pin.

26 Claims, 11 Drawing Sheets

(51) Int. Cl.
*B60D 1/18* (2006.01)
*F16G 13/12* (2006.01)

(58) Field of Classification Search
USPC .......................................................... 280/457
See application file for complete search history.

(56) References Cited

U.S. PATENT DOCUMENTS

| | | |
|---|---|---|
| 3,974,641 A | 8/1976 | Rieger |
| 4,134,256 A | 1/1979 | Fredriksson |
| 4,145,874 A * | 3/1979 | Muller ................... F16G 15/06 |
| | | 59/86 |
| 2015/0028565 A1* | 1/2015 | Bowe ..................... B60D 1/025 |
| | | 280/491.5 |

FOREIGN PATENT DOCUMENTS

| | | |
|---|---|---|
| FR | 2485123 A1 | 12/1981 |
| NZ | 584654 A | 10/2012 |
| NZ | 614801 A | 1/2014 |

* cited by examiner

SAFETY CHAIN ATTACHMENT

The present invention relates to a safety chain attachment device, for example for use in prevention of separation of a trailer from a towing vehicle in the event of accidental decoupling.

In order for a powered vehicle to tow an unpowered vehicle such as a trailer it is necessary to provide a mechanical connection between the vehicles. Due to the occasional in-service failure of mechanical couplings it is desirable to use a secondary means of retaining the trailer for tail-safe purposes. Regulations (such as Australian Design Rule 62) typically prescribe that some form of safety device, for example safety chains or cables, be used to attach the towed vehicle to the towing vehicle to ensure it is properly supported in the event of an accidental decoupling. Regardless of regulatory requirements, it is critically important to ensure a safe connection between vehicles in order to protect the vehicles, other road users, and the community.

One known means of attaching safety chains to a trailer is to provide an attachment member including a clevis and a clevis pin. The attachment member is affixed to the trailer by welding and the clevis pin is used to secure a link of the safety chain to the clevis.

According to a first aspect of the present invention, there is provided an attachment for use with a safety chain which includes a leading link and a following link connected to the leading link, the attachment comprising:

a clevis having first and second lateral side sections and an opening between the side sections into which a leading end of the leading link is receivable; and     a pin member receivable by the first and second side sections so as to extend across the opening to couple the leading link to the clevis when the leading end is received in the opening,     wherein:

a portion of the clevis defined between the first and second sections has a configuration complementary to a configuration of the leading end of the leading link and/or     portions of the first and second side sections have configurations complementary to configurations of portions of a leading end of the following link,     such that there is a close fit between the clevis and chain when the leading link is coupled to the clevis by the pin member.

The "close fit" may involve contact and/or only small clearances between the clevis and either or each of the leading ends. It is thus possible to provide in preferred embodiments of the invention, a greater amount of material between the first and second side sections whilst restricting or minimising the footprint and overall size of the attachment, thereby greatly increasing the strength and load-bearing capability of the clevis and greatly reducing any tendency for the two side sections of the clevis to be forced apart.

Preferably, said portion of the clevis is curved about an axis of curvature which, when the pin is received by the first and second side sections so as to extend across the opening, is coincident with or parallel to a central axis of the pin, whereby to conform to a curvature of the leading end of the leading link. Preferably, said portion of the clevis is so curved through an angle not exceeding 90° so as to permit rotation of the leading link about the axis of curvature or central axis.

Preferably, said portion of the clevis is transversely curved so as to conform to a curvature of the leading end of the leading link which curvature extends from one lateral side of that leading end to the other lateral side of that leading end.

Preferably, said portions of the first and second sections are transversely curved so as to conform to a curvature of the leading end of the following link which, curvature extends from one lateral side of that end to the other lateral side of that end. Preferably, said portions of the first and second sections are curved about an axis of curvature which, when the pin is received by the first and second side sections so as to extend across the opening, is coincident with a central axis of the pin, thereby permitting rotation of the leading link and following link about the central axis. Preferably, the first and second sections are configured with a concavity which is curved about that axis of curvature, the concavity being interrupted by said opening. The leading, end of the following link may be able to slide over said portions during said rotation. Preferably, the concavity is curved through an angle of at least 90° about its axis of curvature, whereby said rotation can be through an angle of at least 90°.

In a preferred embodiment of the present invention, the clevis comprises a slot defining the opening, the slot having a width substantially equal to a thickness of the leading link such that is little or no clearance between the first and second sections and the leading link. Preferably, the slot has a surface which is contoured to accommodate a surface geometry of the leading link.

In a preferred embodiment of the invention, the clevis comprises a seating region having a surface which is complementary to a surface of the leading end of the leading link and/or surfaces which are complementary to surfaces of said portions of the leading end of the following link. The seating region may include a surface which is complementary to the surface geometry of the leading link. In addition, or alternatively, the seating region may have a surface or surfaces complementary to the surface geometry of the following link.

Preferably, the clevis comprises a base a perimeter region of which is weldable or welded to a support surface. Preferably, the perimeter region is recessed in a region at the seating region. This provides for a larger perimeter, and thus greater weld strength, without increasing the footprint of the clevis.

According to a second aspect of the present invention, there is provided an assembly comprising said clevis, said pin member and said chain, wherein the pin member is received by the first and second side sections, so as to extend across the opening, and the leading end of the leading link is received in the opening such that leading link is coupled to the clevis.

Preferably, the pin member is rotatable, about a central axis thereof, with respect to the clevis.

In a preferred embodiment of the invention, the pin member comprises a cylindrical shank configured with diametrically opposed flats arranged so as to pass through the opening through the leading link, when the pin is received by the first and second side sections so as to extend across the opening, the flats being separated by a distance not greater than a width of the opening. Preferably, said distance is substantially equal to said width. The provision of said flats allows for a cross-sectional diameter of the pin which exceeds said width, contributing to the strength of the pin, and possibly also reducing a tendency for the side sections to be forced or pried apart. Preferably, the flats extend only partway along the shank.

Preferably, the pin member is tethered to the clevis, e.g. by way of a wire lanyard. The lanyard may be attached to one end of the pin member, looped over or through the clevis and locked to the other end of the pin member, e.g. via a lynchpin.

In certain embodiments, the attachment may comprise a base plate from which the clevis extends. The base plate may have holes to receive fasteners for fastening the clevis against a support surface. The clevis may be integrally formed with the base plate, or may be separately formed from it and attached to it, e.g. welded to it.

According to a third aspect of the present invention, there is provided a pin member for attaching a leading link of a safety chain to an attachment which comprises a clevis having first and second lateral side sections and an opening between the side sections into which a leading end of the leading link can be received, the pin member being receivable by the first and second side sections so as to extend across the opening to couple the leading link to the clevis when the leading end is so received, the pin member comprising a cylindrical shank configured with diametrically opposed flats which are arranged so as to pass through the opening through the leading link and are separated by a distance not greater than a width of the opening.

Preferably, said distance is substantially equal to said width. The provision of said flats allows for a cross-sectional diameter of the pin which exceeds said width, contributing to the strength of the pin, and possibly also reducing a tendency for the side sections to be forced or pried apart. Preferably, the flats extend only partway along the shank.

Preferred embodiments of the invention will now be describe, by way of non-limiting example only, with reference to the accompanying drawings in which.

Referring to FIGS. 1 to 4, there is shown an attachment 1 comprising a clevis 10 including a first side section generally indicated by reference numeral 20 and a second side section generally indicated by reference numeral 30. The clevis 10 has a convex upper surface 14 and a base 16 which is substantially flat for placement against a support surface. The base 16 has a bevelled edge 12 at each of sides 20, 30.

The clevis 10 is symmetric about a central upright plane arranged between the first and second side sections 20, 30, such that the first side section 20 is the mirror image of the second side section 30, though it will be appreciated that in some embodiments there can be asymmetry between the two side sections without reducing the rated capacity of the clevis under load.

To affix the clevis 10 to the support surface, such as a rearwardly facing surface or underneath surface of a trailer or tow bar, it is welded to the support surface (by any suitable method, such as MIG or arc welding) around a perimeter of its base. In addition, the clevis has recessed portions 40, 41 at opposite ends. Advantageously, this allows a greater perimeter at the base, thereby permitting a longer weld join, without increasing the footprint of the clevis and without substantially affecting the load transfer properties.

First side section 20 includes a boss 22 and second side sect on includes a boss 32. The bosses 22, 32 have apertures 24, 34 respectively extending through them so as to receive a clevis pin 60 in a manner which will later be described.

Each side of side sections 20, 30 has a recessed region 50. Recessing of the sides 20, 30 in this manner reduces the mass of the attachment 1, and limits the maximum thickness through any given cross section, for welding purposes.

Figure 3:
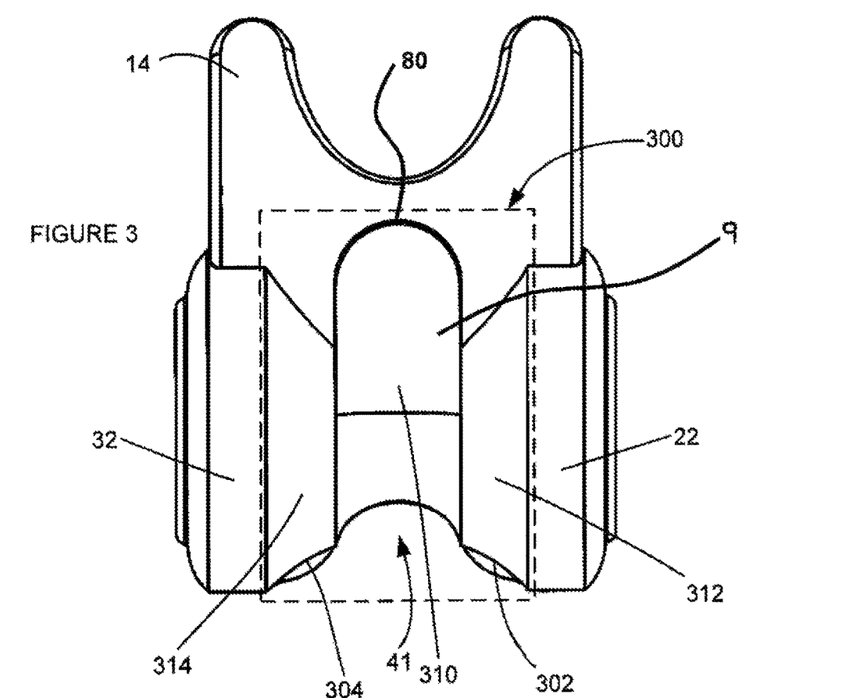
FIG. 3 is a top projection view of the attachment of FIG. 1.
Figure 4:
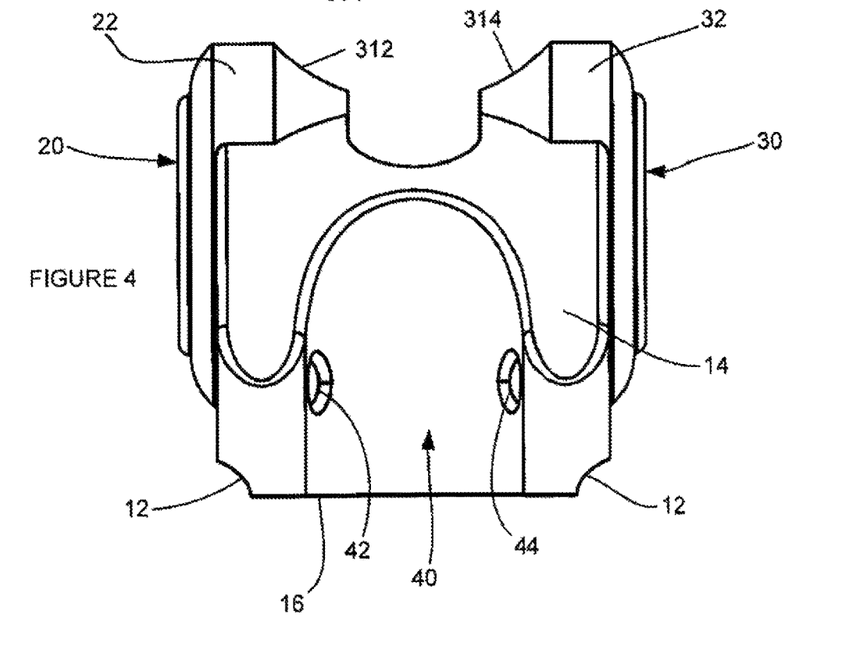
FIG. 4 is a front projection view of the attachment of FIG. 1.

Between the first side section 20 and the second side section 30 there is a recessed seating region, generally indicated by dotted outline 300 in FIG. 3. The seating region includes a first surface portion 310 and second surface portions comprising surface portion 312 on the boss 22 and surface portion 314 on the boss 24, adjacent to the first surface portion 310. There is a smooth transition between surface portion 302 and surface portion 312. Likewise, there is a smooth transition between surface portion 304 and surface portion 314. Surface portions 302, 312, 304 and 314 taper inwardly, portions 302 and 304 doing so in a curved manner (for reasons which will become apparent shortly), towards the centre of clevis 10.

Figure 1:
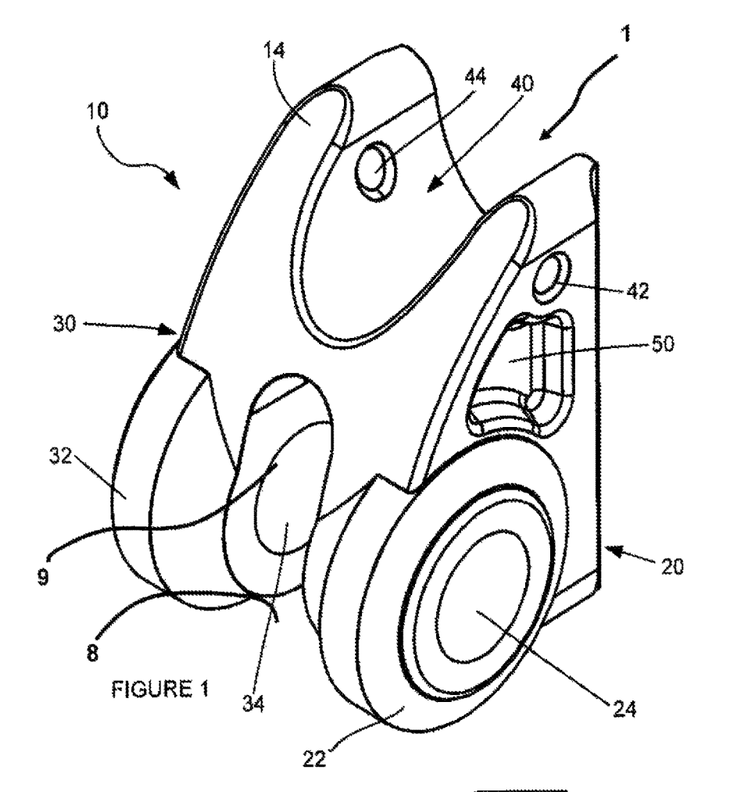
FIG. 1 is an isometric view of an attachment according to a preferred embodiment of the present invention.
Figure 2:
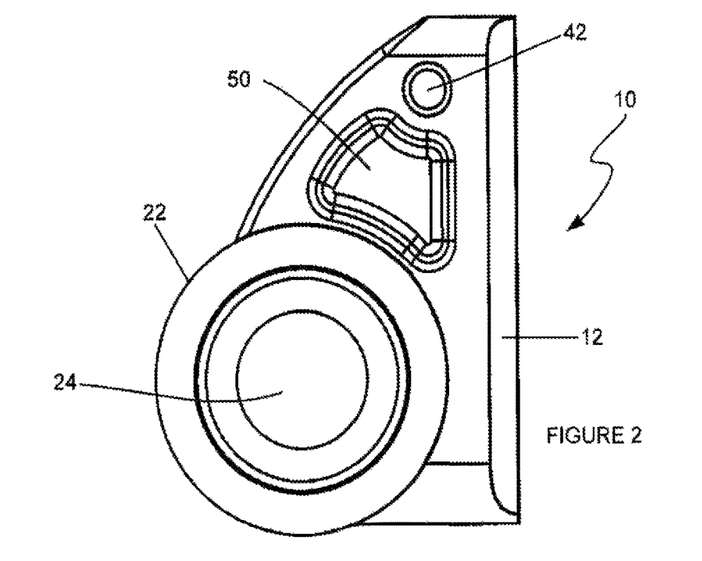
FIG. 2 is a right side projection view of the attachment of FIG. 1.

The seating region 300 includes, referring to FIGS. 1 and 3, a central slot 9 substantially equal to the thickness of a link of a chain (for example, a chain compliant with Australian Standard 2321-2006, entitled *Short-link chain for lifting purposes*) which is to be tethered or coupled to the clevis 10. Advantageously, the provision of slot 9 with the minimum (or close to the minimum) width required to accommodate the leading chain link 500 allows a greater volume of material to be provided in the central part of the clevis 10. Further, contouring seating region 300 to accommodate the surface geometry of the links 500, 510 allows even greater volume of material to be provided. This improves the load bearing capacity in the transverse direction (i.e. the direction extending along apertures 24, 34), reducing any tendency for the sides 20, 30 of the clevis 10 to be forced apart under load.

Figure 5:
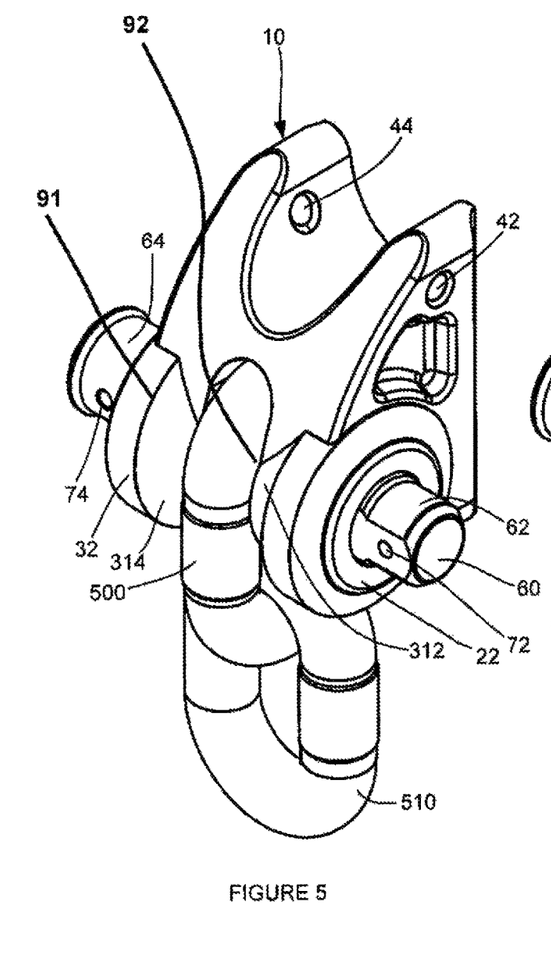
FIG. 5 is an isometric view of an assembly comprising the attachment of FIG. 1, a clevis pin and a chain, according to a preferred embodiment of the present invention.
Figure 6:
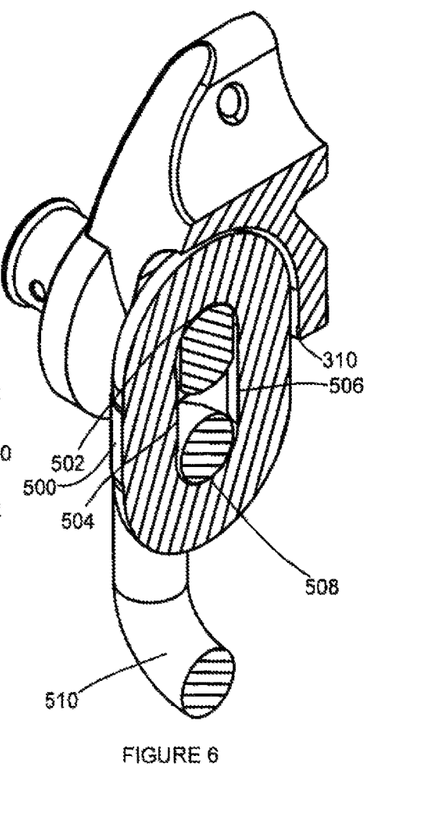
FIG. 6 is a cutaway view of the assembly FIG. 5.
Figure 7:
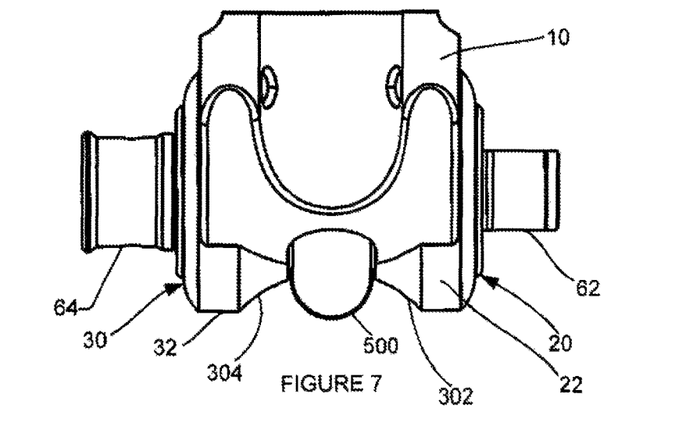
FIG. 7 is a front projection view of the attachment and chain.
Figure 8:
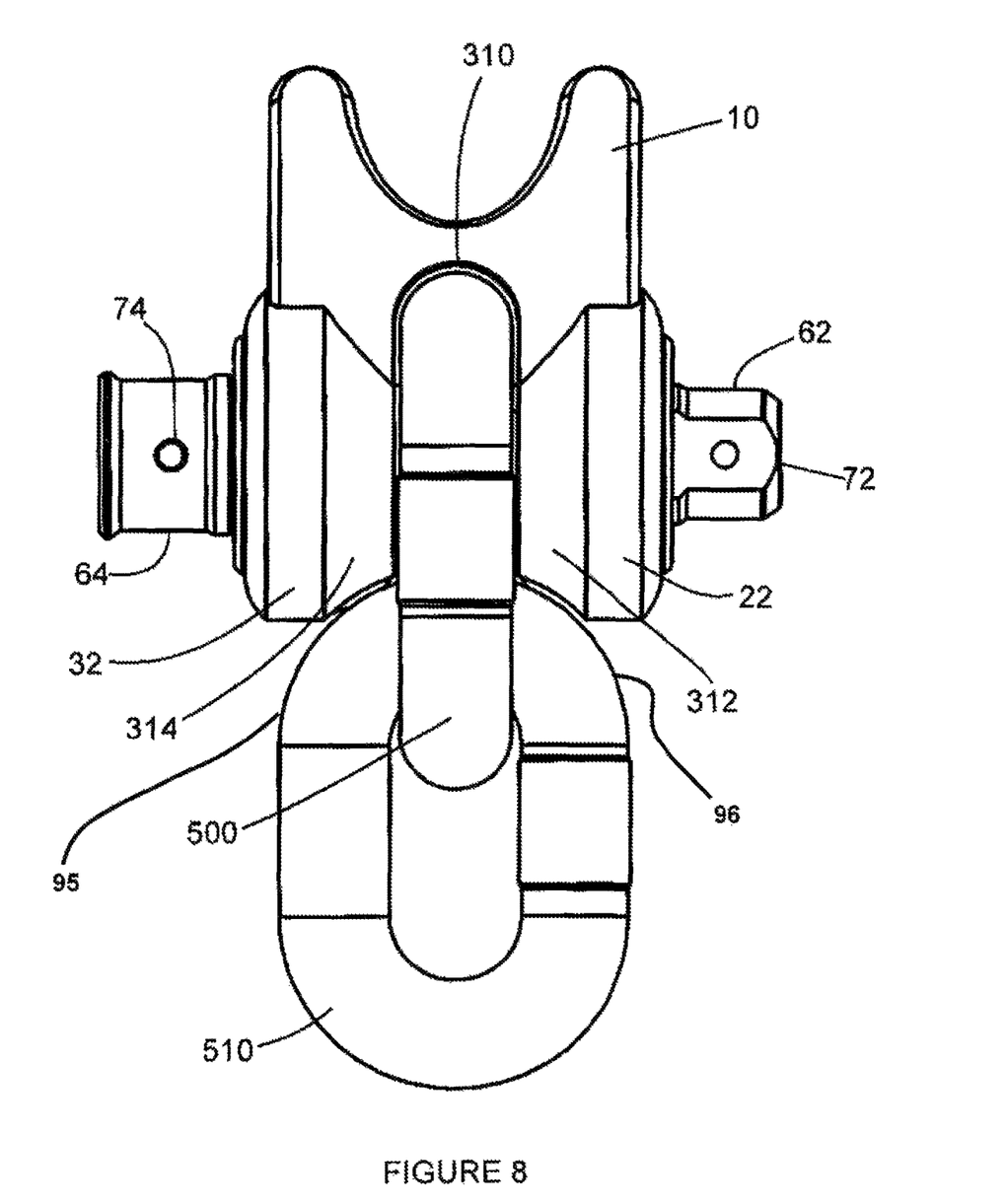
FIG. 8 is a top projection view of the attachment and chain.
Figure 11:
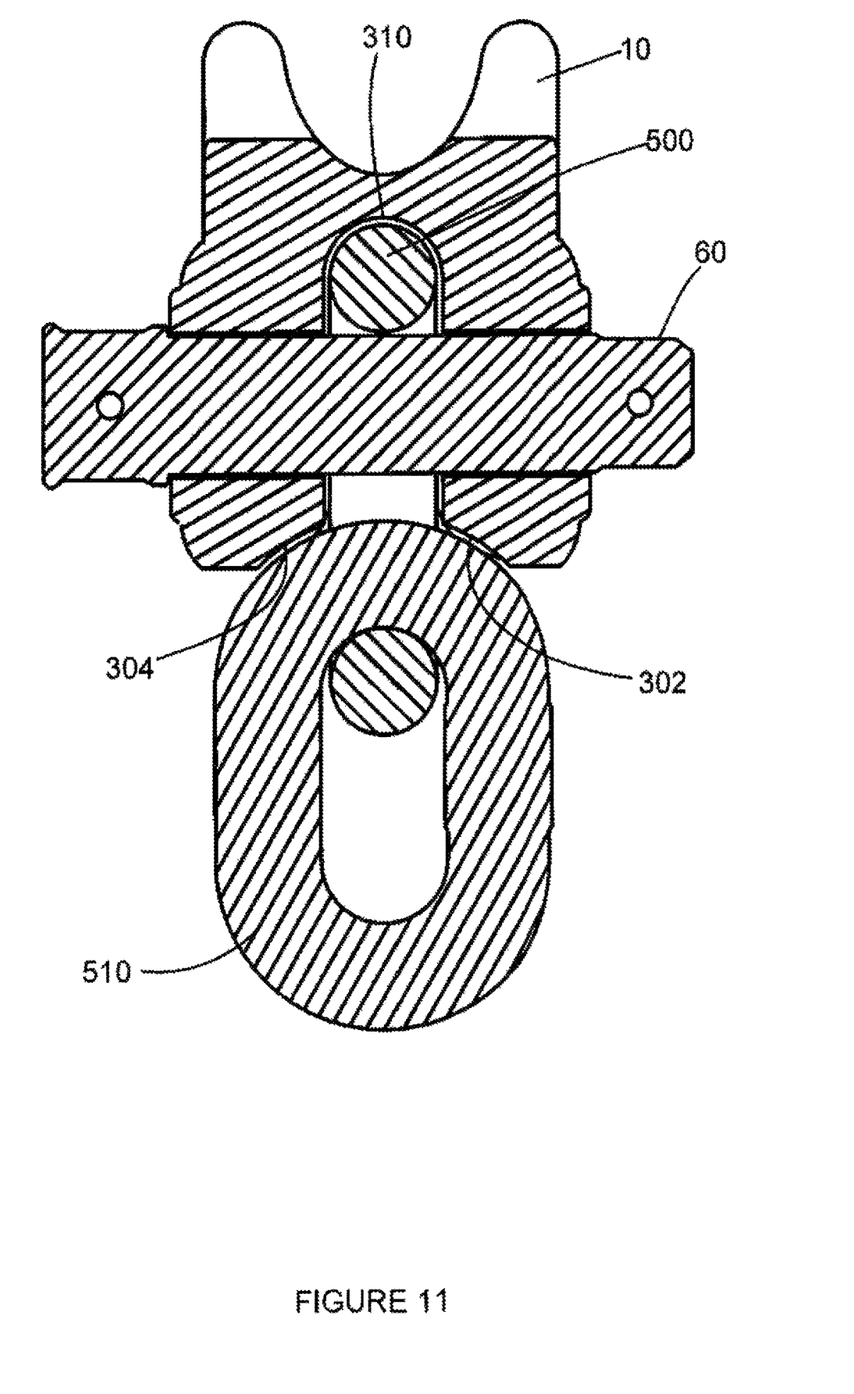
FIG. 11 is a cross-section through the line A-A of FIG. 10.

As best shown in FIGS. 6, 8 and 11, the first surface 310 is contoured to match the surface geometry of leading link 500 when it is received in the seating region 300 and tethered to the devil by the pin member 60. More particularly, the portion defining the first surface 310 is curved about an axis of curvature which, when the pin 60 is mounted to the clevis 10, is coincident with or parallel to a longitudinal axis of the pin 60, whereby to conform to a curvature of the leading end of the leading link which curvature is in the sectional plane shown in FIG. 6. The portion defining the first surface 310 is curved in the aforementioned plane through an angle not exceeding 90° so as to permit the rotation of the leading link about the axis of curvature or longitudinal axis. The portion defining the first surface 310 is also curved transversely, the transverse curvature 80 being shown in FIG. 2, so as to conform to a curvature of the leading end of the leading link 500 which, referring to FIG. 5, extends from one lateral side 91 of that leading end to the other lateral side 92 of that leading end.

The second surface portions are contoured to match the surface geometry of following link 510. More particularly, the surface portions 302, 304 are transversely curved, as can best be seen in FIG. 3, whereby they conform to a curvature of the leading end of the following link which curvature, referring to FIG. 8, extends from one lateral side 95 of that end to the other lateral side 96 of that end. The surface portions 302, 304 are also curved about an axis of curvature which, when the pin 60 is in place, is coincident with the longitudinal axis of the pin 60, thereby permitting rotation of the leading link 500 and following link 510 about the pin longitudinal axis. Referring to FIG. 1, the curvatures of the surface portions 302, 304 are defined by way of a concavity 8 which is curved about that longitudinal axis of the pin 60 when in place, the concavity being interrupted by the opening defined by slot 9. The concavity is curved through an angle of at least 90 about its axis of curvature, whereby rotation of the links 500, 510 relative to the clevis 10 can be through an angle of at least 90°, as will become clear shortly.

Referring now to FIGS. 5 to 11, the clevis 10 is shown in use with a clevis pin 60 which is used to tether a chain, having a leading link 500 and a following link 510, to the clevis 10. It will be appreciated that, in general, there will be a plurality of links joined to the leading link; only links 500 and 510 are shown for the purposes of illustrating the principles of the present embodiments.

To tether the leading link 500 to the clevis 10, it is nestled in the clevis on first surface 310, which complements the geometry of the outer surface of at least the end of the leading link 500, as illustrated in FIG. 6. As will be observed from FIGS. 6 and 11, in this position the following link 510 is seated against second surface portions 302, 304. The clevis pin 60 is then passed through aperture 34 of the second boss 32, the leading link 500, and aperture 24. To secure the pin 60 in place, a wire lanyard (not shown) is secured at a trailing end or head 64 of the pin 60 via hole 74, passed through holes 44 and 42 at the front of the clevis 10 (FIG. 5), and then attached to a leading end or point 62 of pin 60 via hole 72, for example using a lynch pin or other suitable component.

In preferred embodiments, the point 62 of the clevis pin 60 may include a groove (not shown) to accommodate a circlip or other component, which bears against boss 22 to restrain the pin 60 against transverse movement relative to the clevis 10. This improves load transfer into the pin 60, thus further reducing any tendency for the clevis side sections 20, 30 to be forced apart. As will be appreciated, any number of other means of securing the clevis pin may be employed to achieve the same or a similar effect, including hut not limited to a pin, bolt, or tapered shank bolt.

Figure 9:
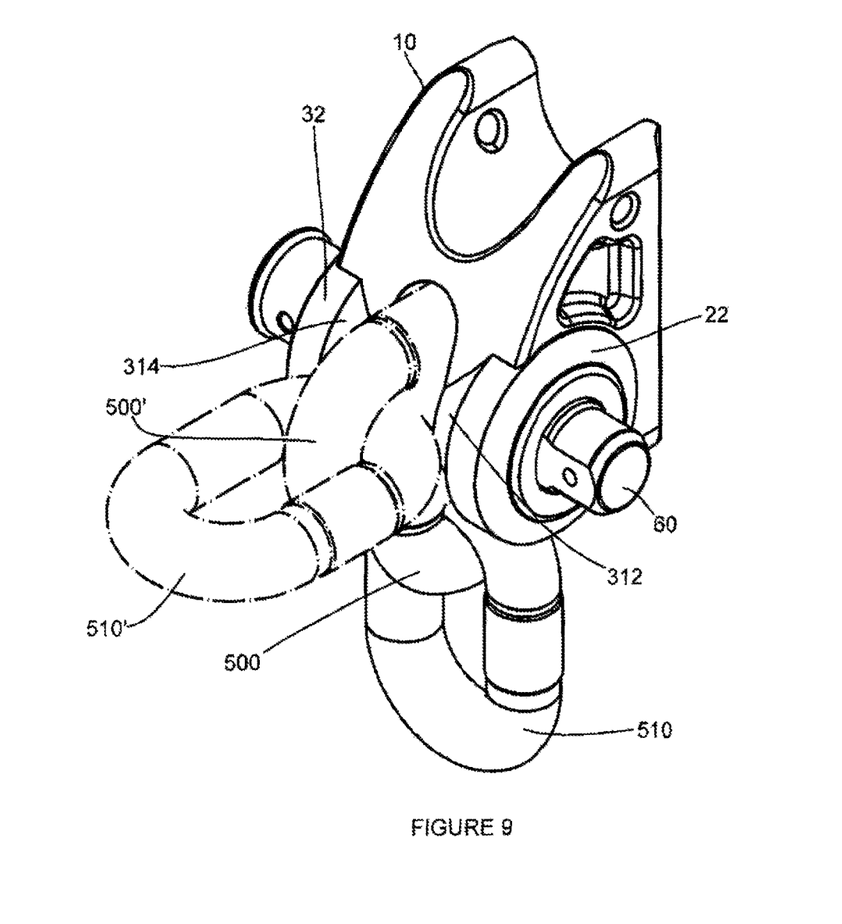
FIG. 9 is an isometric view illustrating a range of movement of the chain.
Figure 10:
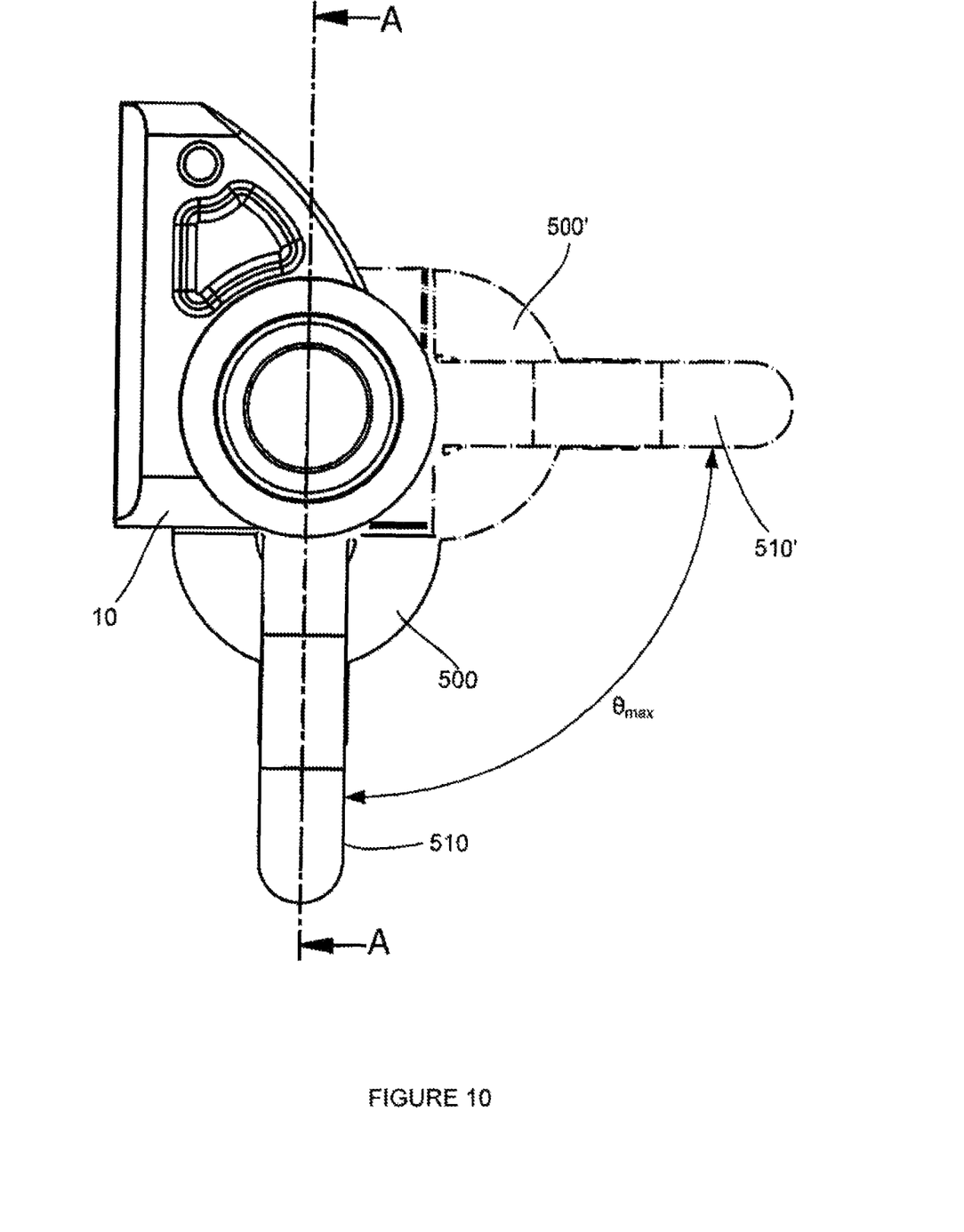
FIG. 10 is a left side projection view of FIG. 9.

As illustrated in FIGS. 9 and 10, the leading link 500 and following link 510 may rotate relative to the clevis 10 about the axis of the pin 60. This is made possible by the contouring of surface portions 312, 314, which allow the outer surface of following link 510 to slide over them. The links 500, 510 may be rotatable by up to an angle of $\theta_{max}$, until they are in the positions 500', 510' shown in phantom in FIGS. 9 and 10. Preferably. $\theta_{max}$ is no less than 90 degrees.

Figure 12:
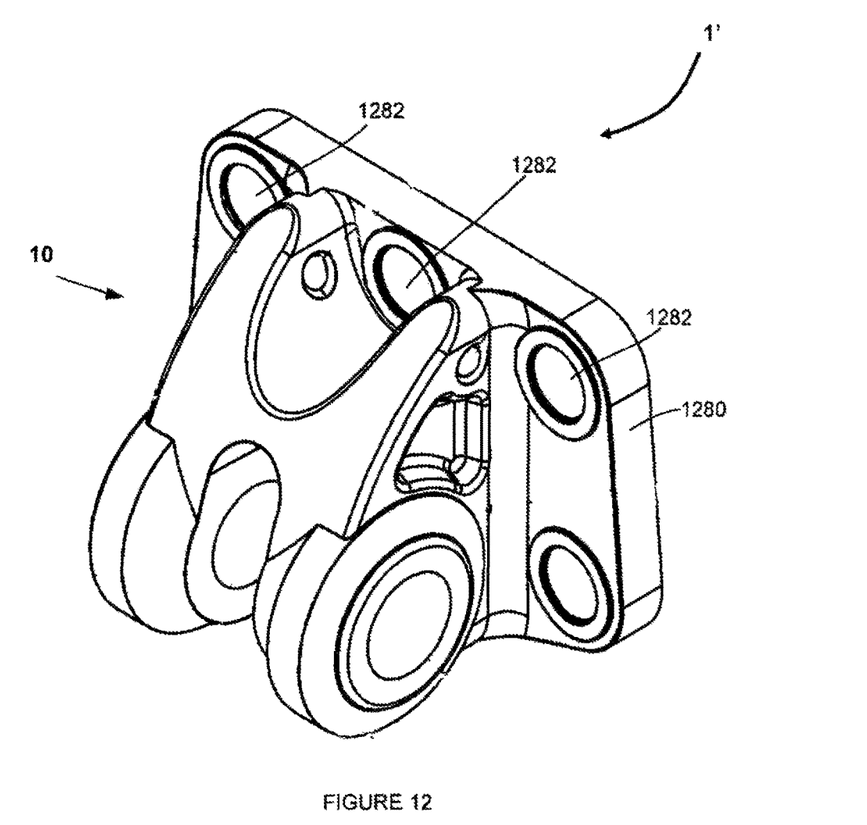
FIG. 12 is an isometric view of an attachment according to another preferred embodiment of the present invention.
Figure 13:
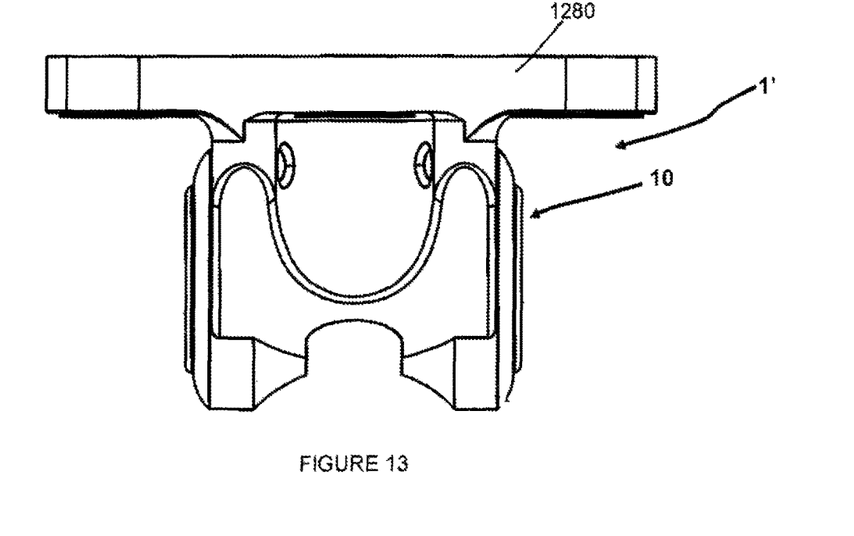
FIGS. 13 and 14 are front and top projection views of the clevis of FIG. 12.
Figure 14:
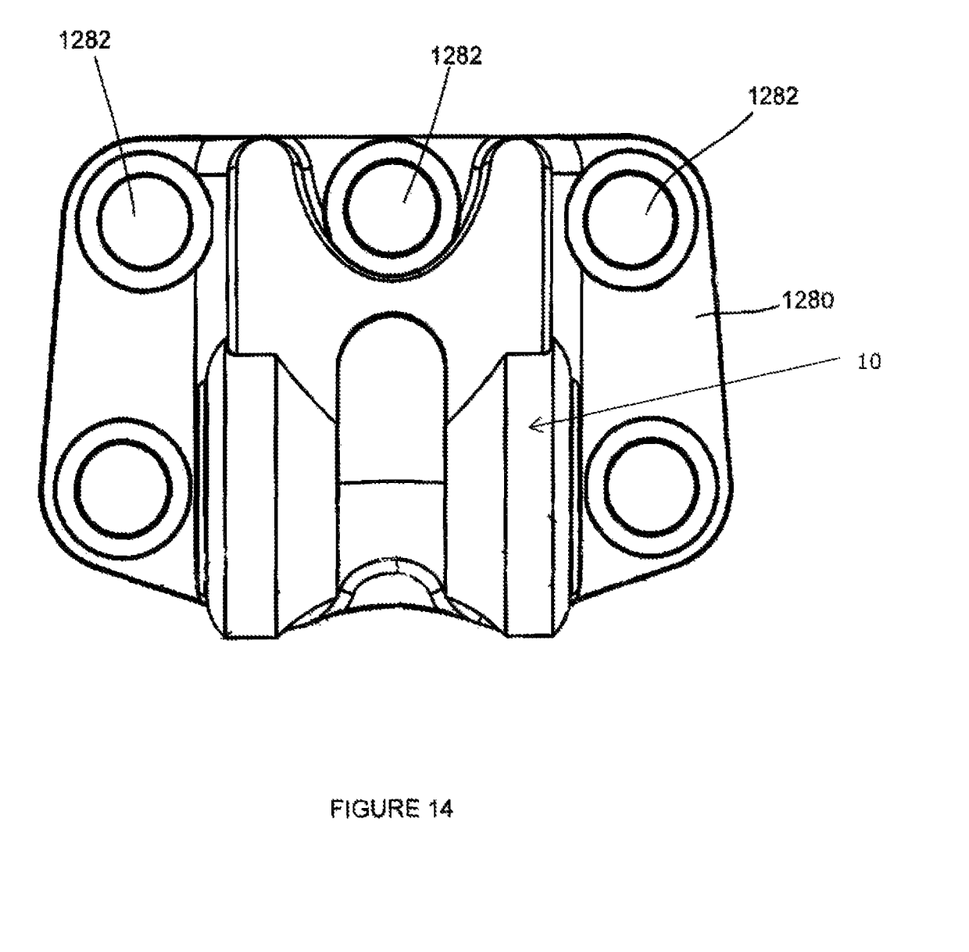
Figure 15:
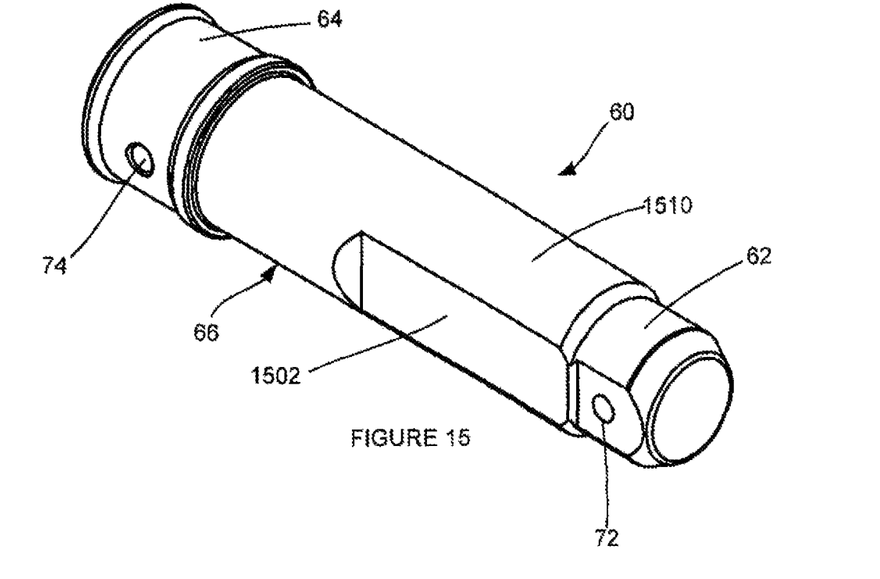
FIG. 15 is an isometric view of a clevis pin.
Figure 16:
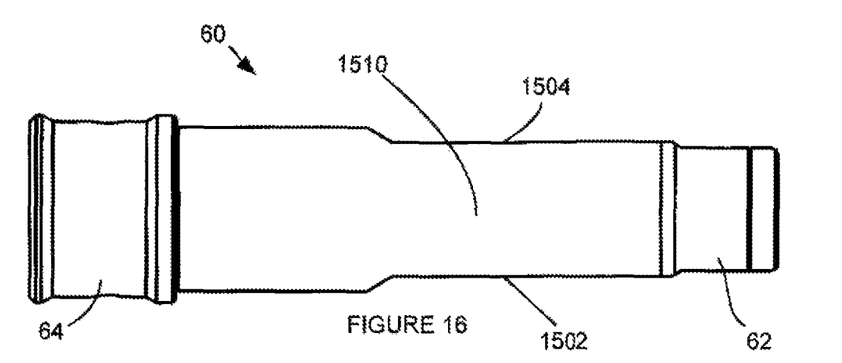
FIGS. 16 and 17 are top and right side projection views of the clevis pin.
Figure 17:
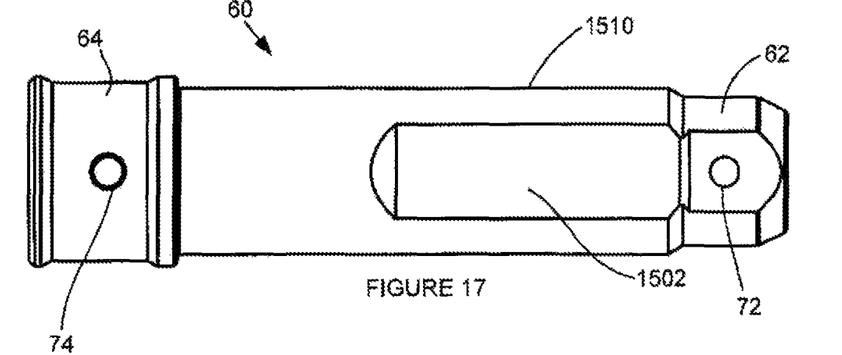

Referring now to FIGS. 12 to 14, there is shown an attachment 1' according to an alternative embodiment of the present invention. The attachment 1' comprises a clevis 10, which is substantially identical in configuration to that of the attachment 1, and a base plate 1280, which may be integral with the clevis 10 or attached to the clevis 10 by suitable means, e.g. welding, the base plate 1280 being configured with mounting holes 1282 which can receive fasteners such as bolts, to secure the attachment 1' against the support surface.

Turning now to FIGS. 15 to 18, there is shown a clevis pin 60 suitable for use with the devises 10 and 10' and chain. The clevis pin 60 has a leading end or point 62, a trailing end or head 64 and a shank or body generally indicated by reference numeral 66. The point 62 has a hole 72 for receiving a lynchpin (for example) at one end of a wire lanyard, and the head 64 has a hole 74 for receiving and securing the other end of the wire lanyard.

Figure 18:
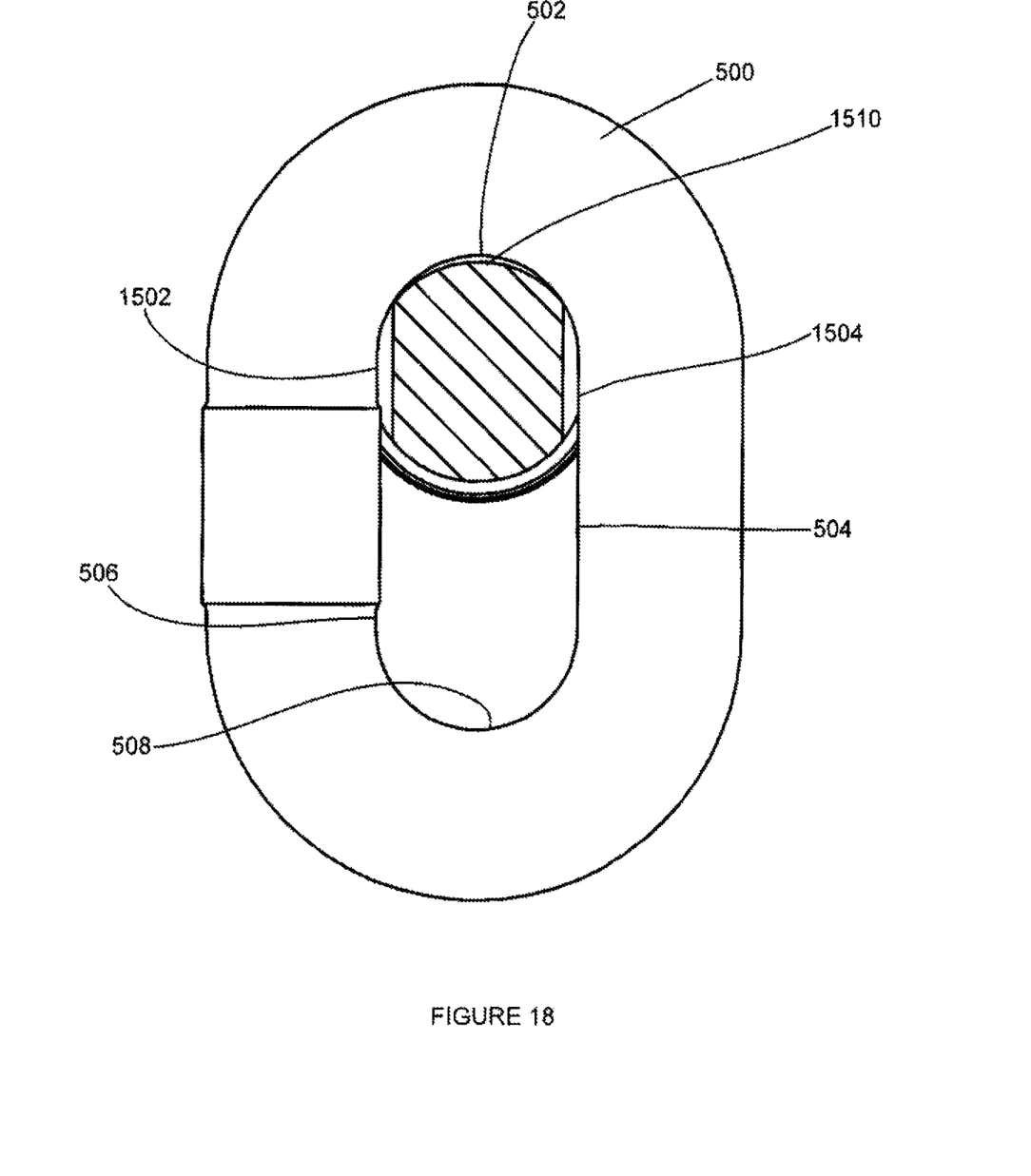
FIG. 18 is a cross-sectional view of the clevis pin positioned within a chain link.

The body or shank 66 of clevis pin 60 has flattened portions 1502, 1504 extending partially along its length and located either side of a curved upper portion 1510. When leading link 500 is tethered to the clevis 10 or 10' using the clevis pin 60 (FIGS. 5 to 11), then as shown in FIG. 18, the upper curved portion 1510 mates with an upper curved portion 502 on an internal surface of link 500, while flattened portions 1502, 1504 mate with respective flat internal surface portions 506, 504 of the link 500, such that the clevis pin 60 occupies the maximum possible width within the link 500 (to within a tolerance which allows the pin to be relatively readily inserted within the link 500). Accordingly, the diameter of the shank 66 may be made larger than would otherwise be the case if a pin with a constant, circular, cross-section was used, so that the pin 60 is stronger.

It will be appreciated that various modifications, additions and alterations may be made to the invention by one skilled in the art without departing from the spirit and scope of the invention as defined in the appended claims.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. An attachment for use with a safety chain which comprises a leading link and a following link connected to the leading link, the attachment comprising:
   a clevis having first and second lateral side sections and an opening between the side sections into which a leading end of the leading link is receivable; and
   a pin member receivable by the first and second lateral side sections so as to extend across the opening to couple the leading link to the clevis when the leading end is received in the opening,
   wherein a portion of the clevis defined between the first and second lateral side sections is curved about an axis of curvature which, when the pin member is received by the first and second lateral side sections so as to extend across the opening, is coincident with or parallel to a central axis of the pin member, whereby said portion conforms to a curvature of the leading end of the leading link and thus has a configuration complementary to a configuration of the leading end of the leading link, such that there is a close fit between the clevis and chain when the leading link is coupled to the clevis by the pin member.

2. An attachment according to claim 1, wherein said portion of the clevis is so curved through an angle not exceeding 90° so as to permit rotation of the leading link about the axis of curvature or central axis.

3. An attachment according to claim 1, wherein said portion of the clevis is transversely curved so as to conform to a curvature of the leading end of the leading link which curvature extends from one lateral side of that leading end to the other lateral side of that leading end.

4. An attachment according to claim 1, wherein portions of the first and second lateral side sections are transversely curved so as to conform to a curvature of the leading end of the following link which curvature extends from one lateral side of that end to the other lateral side of that end.

5. An attachment according to claim 4, wherein said portions of the first and second lateral side sections are curved about an axis of curvature which, when the pin member is received by the first and second lateral side sections so as to extend across the opening, is coincident with a central axis of the pin member, thereby permitting rotation of the leading link and following link about the central axis.

6. An attachment according to claim 5, wherein the first and second lateral side sections are configured with a concavity which is curved about said axis of curvature, the concavity being interrupted by said opening.

7. An attachment according to claim 6, wherein the concavity is curved through an angle of at least 90° about its axis of curvature, whereby said rotation can be through an angle of at least 90°.

8. An attachment according to claim 5, wherein said portions of the first and second lateral side sections are configured such that the leading end of the following link can slide over those portions during said rotation.

9. An attachment according to claim 1, comprising a base a perimeter region of which is weldable or welded to a support surface.

10. An assembly comprising:
a clevis according to claim 1;
said pin member; and
said chain,
wherein the pin member is received by the first and second lateral side sections, so as to extend across the opening, and the leading end of the leading link is received in the opening such that the leading link is coupled to the clevis.

11. An assembly according to claim 10, wherein the pin member is rotatable, about a central axis thereof, with respect to the clevis.

12. An assembly according to claim 10, wherein the pin member comprises a cylindrical shank configured with diametrically opposed flats passing through the opening through the leading link, the flats being separated by a distance not greater than a width of the opening.

13. An assembly according to claim 12, wherein said distance is substantially equal to said width.

14. An assembly according to claim 12, wherein the flats extend only partway along the shank.

15. An assembly according to claim 10, wherein the pin member is tethered to the clevis.

16. An attachment for use with a safety chain which comprises a leading link and a following link connected to the leading link, the attachment comprising:

a clevis having first and second lateral side sections and an opening between the side sections into which a leading end of the leading link is receivable; and a pin member receivable by the first and second lateral side sections so as to extend across the opening to couple the leading link to the clevis when the leading end is received in the opening, wherein portions of the first and second lateral side sections are transversely curved so as to conform to a curvature of the leading end of the following link which curvature extends from one lateral side of that end to the other lateral side of that end, thus having configurations complementary to configurations of portions of a leading end of the following link, such that there is a close fit between the clevis and chain when the leading link is coupled to the clevis by the pin member, and wherein the portions of the first and second lateral side sections are curved about an axis of curvature which, when the pin member is received by the first and second lateral side sections so as to extend across the opening, is coincident with a central axis of the pin member, thereby permitting rotation of the leading link and following link about the central axis.

17. An attachment according to claim 16, wherein the first and second lateral side sections are configured with a concavity which is curved about said axis of curvature, the concavity being interrupted by said opening.

18. An attachment according to claim 17, wherein the concavity is curved through an angle of at least 90° about its axis of curvature, whereby said rotation can be through an angle of at least 90°.

19. An attachment according to claim 16, wherein said portions of the first and second lateral side sections are configured such that the leading end of the following link can slide over those portions during said rotation.

20. An attachment according to claim 16, comprising a base a perimeter region of which is weldable or welded to a support surface.

21. An assembly comprising:
a clevis according to claim 16;
said pin member; and
said chain,
wherein the pin member is received by the first and second lateral side sections, so as to extend across the opening, and the leading end of the leading link is received in the opening such that the leading link is coupled to the clevis.

22. An assembly according to claim 21, wherein the pin member is rotatable, about a central axis thereof, with respect to the clevis.

23. An assembly according to claim 21, wherein the pin member comprises a cylindrical shank configured with diametrically opposed flats passing through the opening through the leading link, the flats being separated by a distance not greater than a width of the opening.

24. An assembly according to claim 23, wherein said distance is substantially equal to said width.

25. An assembly according to claim 23, wherein the flats extend only partway along the shank.

26. An assembly according to claim 21, wherein the pin member is tethered to the clevis.

* * * * *